United States Patent
Rayner

[11] Patent Number: 5,994,791
[45] Date of Patent: Nov. 30, 1999

[54] PORTABLE CONTROLLED LIGHTING SYSTEM

[75] Inventor: Gary A. Rayner, San Diego, Calif.

[73] Assignee: Nite Rider Light Systems, Inc., San Diego, Calif.

[21] Appl. No.: 08/891,169

[22] Filed: Jul. 10, 1997

[51] Int. Cl.[6] .................................................. H05B 39/02
[52] U.S. Cl. ............................ 307/31; 315/293; 315/297; 362/317; 362/411
[58] Field of Search ............................... 307/46, 205, 31; 315/292, 295, 312, 154, 294, 297, 293; 362/295, 317, 411; 353/85

[56] References Cited

U.S. PATENT DOCUMENTS

| | | | |
|---|---|---|---|
| 3,706,913 | 12/1972 | Malatchi | 315/292 |
| 3,760,174 | 9/1973 | Boenning et al. | 315/312 |
| 3,991,343 | 11/1976 | Delpy | 315/360 |
| 4,167,783 | 9/1979 | Mitchell | 362/411 |
| 4,408,142 | 10/1983 | Wilje | 315/294 |
| 4,964,719 | 10/1990 | Tachikawa et al. | 353/85 |
| 4,985,661 | 1/1991 | Lin | 315/154 |
| 5,206,564 | 4/1993 | Wessels | 315/209 |
| 5,459,376 | 10/1995 | Buij et al. | 315/297 |
| 5,627,362 | 5/1997 | Youngquist et al. | 250/205 |

*Primary Examiner*—Albert W. Paladini
*Attorney, Agent, or Firm*—Brown, Martin, Haller & McClain, LLP

[57] ABSTRACT

A portable controlled lighting system comprising at least one lamp connected to an operating circuit for operating the lamp and a control circuit coupled to the operating circuit for controlling the luminous flux of the lamp is disclosed. A battery pack for providing electrical power to the operating circuit is also provided, together with a control means for adjusting the luminous flux of the lamp by the control circuit. The control means comprises a first adjustment means for controlling the luminous flux of the lamp and provides a predetermined rate of increase of the luminous flux until a predetermined flux level is achieved.

9 Claims, 6 Drawing Sheets

PORTABLE CONTROLLED LIGHTING SYSTEM

TECHNICAL FIELD

The present invention relates to lighting systems and, more particularly, to controlled lighting systems wherein the luminous flux of a lamp is variably adjusted.

BACKGROUND OF THE INVENTION

Controlled lighting systems are known. Such systems typically comprise a series of one or more light elements intended to be permanently mounted to a structure, and wherein the power to each light element is supplied from a residential or industrial circuit and controlled from a remote location. The power supplied to each light element is varied to change the amount of light produced by the element as desired.

However, such systems are generally not readily adaptable to power supplied by a battery pack for portability, nor to the requirements imposed upon a portable lighting system for sports and recreational applications. Furthermore, such prior systems tend to be expensive and thus the range of potential applications in which the controlled lighting systems may effectively be employed is limited.

Therefore, it is considered desirable to provide a portable controlled lighting system which obviates or mitigates certain of the disadvantages or problems associated with the stationary controlled lighting systems of the prior art.

DISCLOSURE OF THE INVENTION

The present invention provides a portable controlled lighting system which, in one aspect, comprises at least one lamp connected to an operating circuit for operating the lamp and a control circuit coupled to the operating circuit for controlling the luminous flux of the lamp. A battery pack for providing electrical power to the operating circuit is also provided, together with a control means for adjusting the luminous flux of the lamp by the control circuit. The control means comprises a first adjustment means for controlling the luminous flux of the lamp and provides a predetermined rate of increase of the luminous flux until a predetermined flux level is achieved.

A further aspect of the invention provides a portable controlled lighting system having a plurality of lamps connected to the operating circuit and controlled by the control circuit.

Portable controlled lighting systems of the present invention also provide means for controlling the charging and discharging of the battery pack, means for reporting the level of charge of the battery pack to an operator of the lighting system, means for discontinuing the luminous flux of the lamp when the battery pack is reduced to a predetermined level of charge, means for initiating and discontinuing the luminous flux of the lamp in a predetermined repeating pattern, and, in systems having a plurality of lamps, means for controlling the luminous flux of each of the lamps and fading between the lamps in response to a variety of predetermined conditions.

BRIEF DESCRIPTION OF THE DRAWINGS

Preferred embodiments of the present invention will now be described with reference to the attached figures wherein.

DETAILED DESCRIPTION OF THE INVENTION

The present invention provides a portable controlled lighting system which, in one aspect, comprises at least one lamp connected to an operating circuit for operating the lamp and a control circuit coupled to the operating circuit for controlling the luminous flux of the lamp. A battery pack for providing electrical power to the operating circuit is also provided, together with a control means for adjusting the luminous flux of the lamp by the control circuit. The control means comprises a first adjustment means for controlling the luminous flux of the lamp and provides a predetermined rate of increase of the luminous flux until a predetermined flux level is achieved.

A further aspect of the invention provides a portable controlled lighting system having a plurality of lamps connected to the operating circuit and controlled by the control circuit.

Portable controlled lighting systems of the present invention also provide means for controlling the charging and discharging of the battery pack, means for reporting the level of charge of the battery pack to an operator of the lighting system, means for discontinuing the luminous flux of the lamp when the battery pack is reduced to a predetermined level of charge, means for initiating and discontinuing the luminous flux of the lamp in a predetermined repeating pattern, and, in systems having a plurality of lamps, means for controlling the luminous flux of each of the lamps and fading between the lamps in response to a variety of predetermined conditions.

Figure 1:
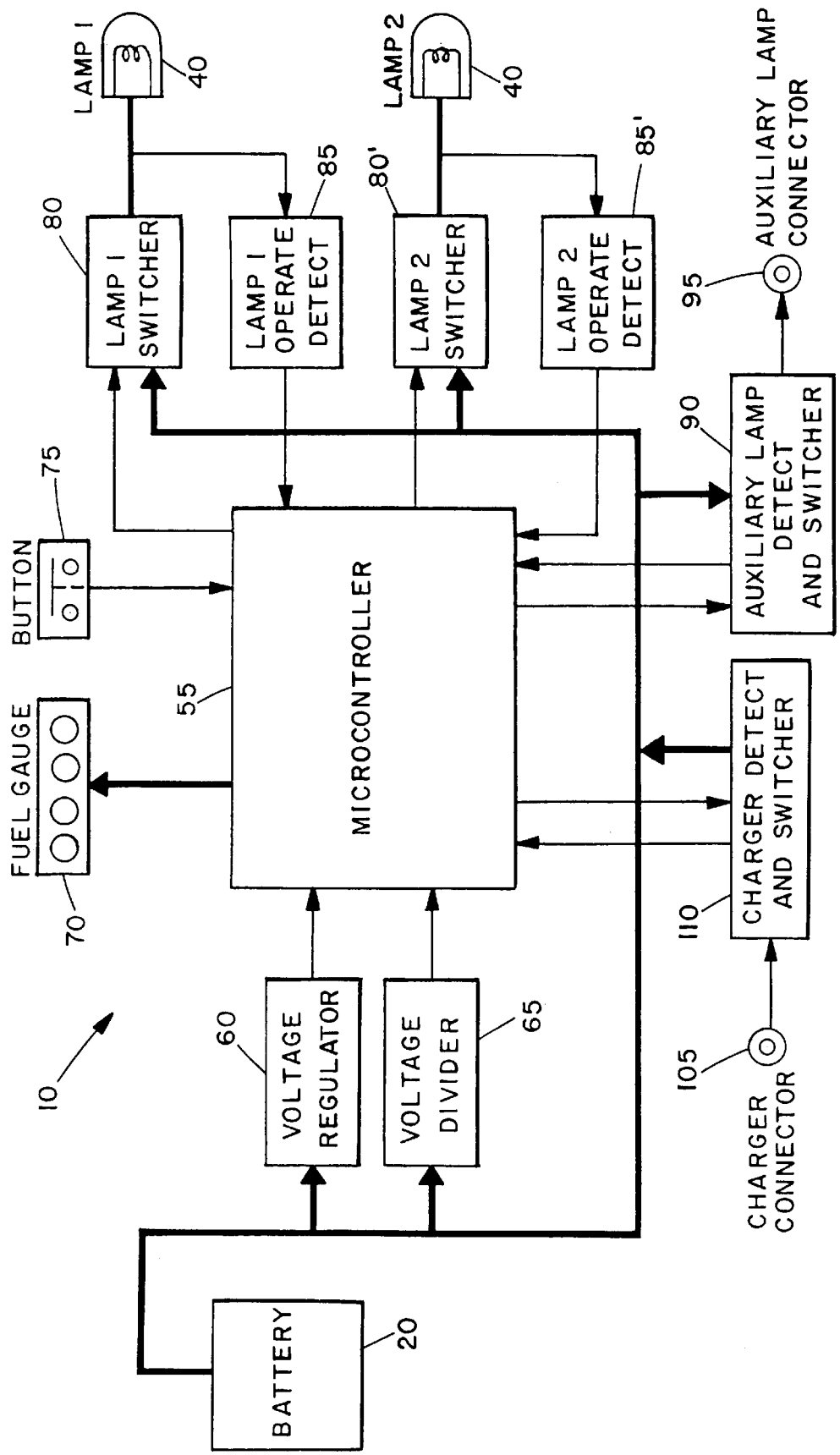
FIG. 1 depicts a block diagram of an embodiment of the functional elements of a portable controlled lighting system in accordance with the present invention.

FIG. 1 shows a block diagram of a lighting system 10 in accordance with the present invention. The system 10 includes a battery pack 20 connected by an operating circuit 50 to at least one lamp 40. Also included is a control circuit 50 which comprises a controller 55, which is typically a microprocessor and desirably a RISC microprocessor, which controls all the functions of the lamp, the battery pack and the charging of the battery pack as part of the system.

Considering each component of the present system separately, for purposes of clarity, the battery pack 20 of the present invention can be either a single use primary battery or, desirably, it will be a rechargeable battery such as a nickel/cadmium (NiCd) battery, most commonly a "C" cell, such as are commonly available in the industry, for example, as product number KR-2800CE, available from Sanyo. Battery pack in accordance with the invention can consist of a single cell, but more commonly will comprise a plurality of cells joined in series. The battery pack will desirably be encased in a container, either together with, but more commonly separate from, the remaining components of the present lighting system. Such a container will often include desirable attributes, such as moisture resistance, depending upon the particular application intended for the system.

The battery pack will be operatively connected by an operating circuit through a lamp switch to at least one lamp 40 to form the basis of a lighting system 10 in accordance with the present invention. A lamp utilized in the practice of the present invention will typically be an incandescent lamp designed to provide luminous flux when a voltage is applied. Typically, such lamps will include quartz or other filaments and mercury or halogen vapor in a sealed unit. Such lamps are readily available commercially such as, for example, as a 20 watt, 12 volt halogen lamp available as product number JDR/M-0026, available from Ushio.

As further depicted in FIG. 1, a voltage regulator 60 will be provided to insure that a constant voltage is applied to the microprocessor 55 and the other circuitry employed in the control circuit. A voltage divider 65 will also be included to reduce the voltage from the battery pack 20 to be converted from analog to digital form by the microprocessor 55. The microprocessor 55 can then measure the battery voltage to determine the appropriate lamp brightness control and to predetermine the acceptable level of charge to eliminate battery damage due to overcharging or over-discharging.

The microprocessor 55 (or microcontroller) is desirably provided as a self-contained microprocessor or integrated circuit containing the software routines which provide the control functions of the present system. In general, the microprocessor is configured using source code routinely written by a programmer to perform the desired processing of the input and output signals, and to incorporate the functionality of the operational flowcharts. The source code can conveniently be written in machine code, or in a higher level language such as C, all in accordance with practices well known in the art.

The source code can then be compiled and, desirably, tested in a simulator to ensure proper performance of the desired operations. The compiled code is then programmed into the permanent program memory of the microprocessor utilizing an industry standard programmer. The microprocessor is then inserted into the control circuit preparatory to being utilized in the present lighting system.

Also provided in embodiments of the present invention is a "fuel gauge" 70 which provides a report, e.g. via a visual display, to the operator of the lighting system of the level of battery charge in the battery pack 20. Such a report or display can be provided, for example, by a series of light emitting diodes (LEDs), a liquid crystal display (LCD) or other visual display device as commonly known in the art.

A switch 75, e.g. a button switch, is also provided for operator control of the microprocessor 55, and thus of the lighting system 10 as a whole. The signal from the switch 75 will be detected by the microprocessor 55 and can be used to turn on the system, to turn it off, to change the predetermined level of luminous flux from the lamp and to change the various operating functions.

As mentioned previously, a switcher circuit 80 will also control the voltage applied to the lamp 40 and thus the amount of luminous flux produced by the lamp. The switch circuit 80 will be under the operating control of the microprocessor 55 so that the microprocessor can increase the luminous flux of the lamp 40 at a predetermined rate up to a predetermined level of flux (or brightness). A detection circuit 85 will also be provided to detect the voltage applied when the lamp 40 is turned on or off. This voltage will be read by the microprocessor software to determine if the filament in the lamp 40 is operating correctly.

In systems in accordance with the invention which have a plurality of lamps, a parallel set of switch circuits 80, 80' and detection circuits 85, 85' will be provided for each additional lamp. In addition, a circuit 90 may be provided for including an auxiliary lamp 95 and includes a detection circuit to signal the presence of the auxiliary lamp 95 to the microprocessor 55. Such an auxiliary lamp 95 may for example be a light emitting diode or an incandescent lamp. The microprocessor 55 will detect if an auxiliary lamp 95 is connected to the system by the detection circuit. The circuit will also control the switching and the luminous flux of the auxiliary lamp.

Furthermore, a connection is provided for including a charger 105 for the battery pack 20 into the circuit. Circuitry 110 will be provided to detect the presence of the battery charger 105. The microprocessor 55 will detect if a battery charger 105 is connected to the system 10 and charging of the battery pack 20 will be performed under the control of the battery pack 20 to be monitored and controlled by the microprocessor 55. Alternatively, the same connector used for the auxiliary lamp 95 connector can be utilized as a connection circuit for the battery charger.

Figure 2:
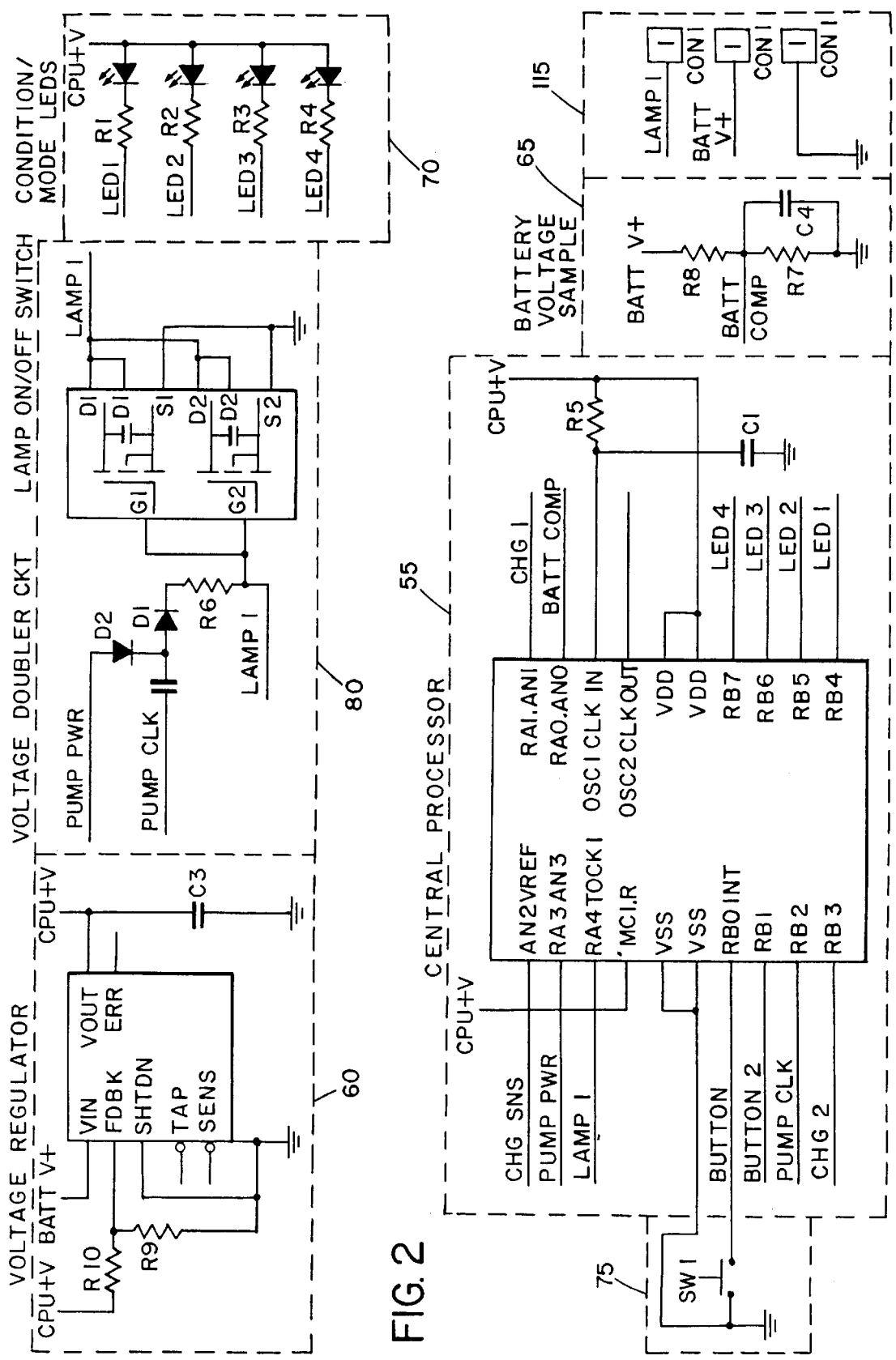
FIG. 2 depicts a schematic diagram of an additional embodiment of a portable controlled lighting system in accordance with the present invention.

The circuitry for one embodiment of the invention having a plurality of lamps is depicted in greater detail in FIG. 2. In this embodiment, the preferred signal interconnections among microprocessor 55, voltage regulator 60, voltage divider 65, "fuel gauge" 70, switch 75, switcher circuit 80 and detection circuit 85 are shown. Contacts 115 to which lamp 40 (not shown in FIG. 2) can be connected are also shown.

Figure 3:
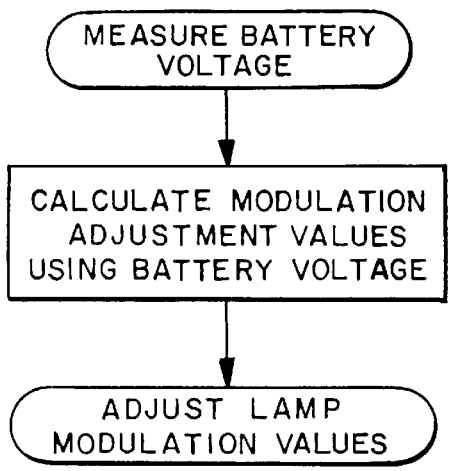
FIG. 3 depicts a block diagram of an algorithm used to control the luminous flux of a lamp of the present invention.

The various algorithms used to provide the control functions for the microprocessor will now be described. First, as depicted in FIG. 3, an algorithm is provided to monitor the luminous flux of the lamp and, desirably, maintain continuous adjustment to provide a constant level of luminous flux. The algorithm will measure the battery voltage, calculate the modulation adjustment values using the battery voltage measurement and adjust lamp modulation values in response to these calculations. Such an algorithm is called regularly and repetitively in a looped fashion. It is designed to adjust the power driving the lamp to maintain a constant level of luminous flux regardless of the battery voltage. If the battery voltage increases, then the power applied to the lamp is reduced to compensate. If the voltage decreases, then the algorithm will increase the power to the lamp in order to maintain a continuous predetermined level of luminous flux.

Figure 4:
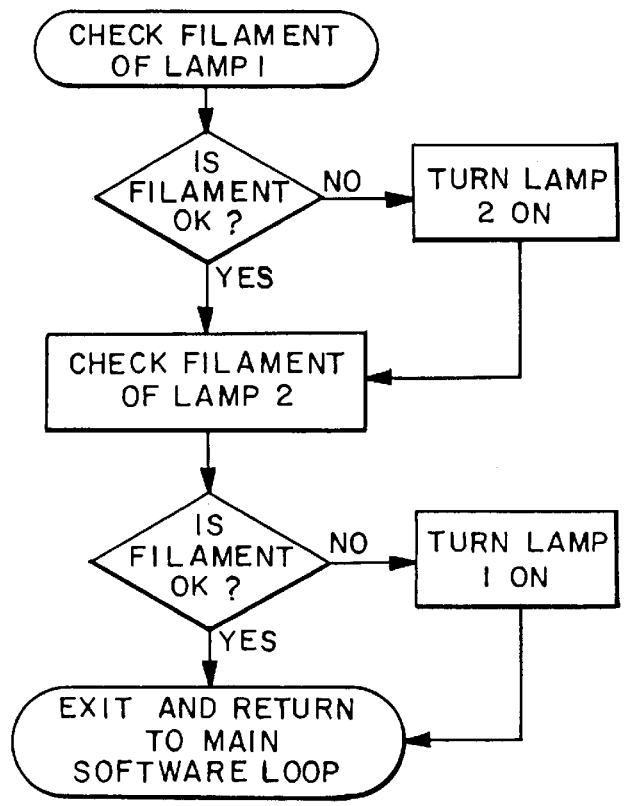
FIG. 4 depicts a block diagram of an algorithm used to detect the failure of a lamp of the present invention.

An algorithm is also provided to detect a failure of a lamp in the lighting system, as depicted in FIG. 4. The algorithm will first check the filament of a first lamp and if the filament is not functioning, a second lamp will be switched on. In either circumstance, the algorithm will check the filament of the second lamp and if the filament of the second lamp is not functioning the controller will apply voltage to the first lamp. In either circumstance, after checking the filament in the second lamp, the algorithm will exit and return to the main software loop. The lamp detection routine checks the state of the filaments of the lamp in multiple lamp system. If one of the filaments fails, the remaining lamp will instantly turn on to prevent a black out condition.

Figure 5:
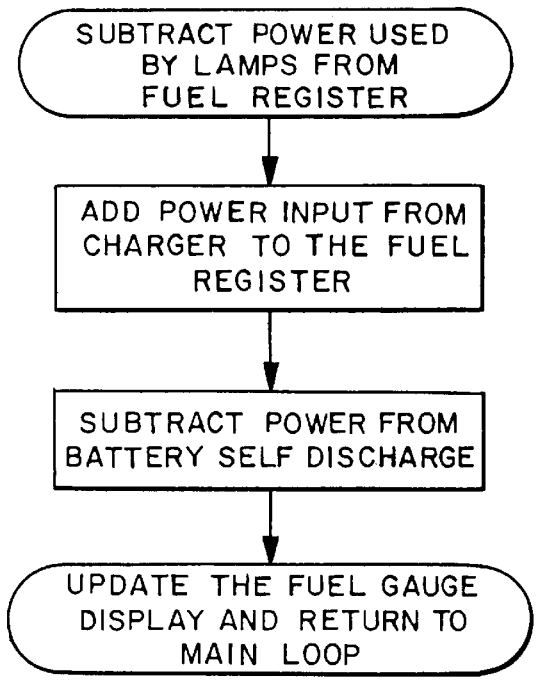
FIG. 5 depicts a block diagram of an algorithm used to monitor the level of charge of a battery pack of the present invention.

An algorithm is also provided to monitor and report the level of charge in the battery pack, as depicted in FIG. 5. This can be termed a "fuel gauge" for the lighting system. The algorithm subtracts the power used by the lamps from the fuel register and adds power input from the charger to the fuel register, subtracts power from the battery self discharge and updates the reported level of charge to the display before returning to the main software loop. The "fuel gauge" is a visual display which indicates the state of charge of the battery. It will have a variable register which hold the current state of the battery charge. This routine periodically and repetitively updates the fuel gauge register to compensate for power drain from the battery by the system, the lamps and battery self discharge. It also updates the fuel gauge when power is added back into the battery by charging the battery.

Figure 6:
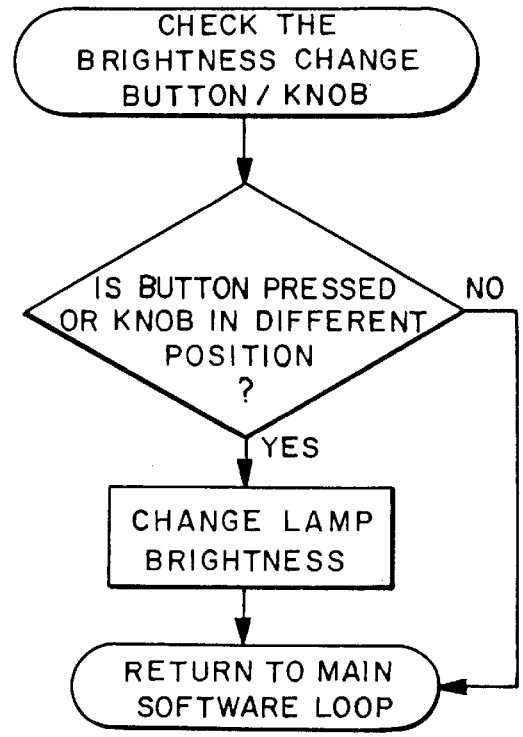
FIG. 6 depicts a block diagram of an algorithm used to control the luminous flux of a lamp of the present invention.

An algorithm is also provided to change the luminous flux of the lamp, as depicted in FIG. 6. The algorithm first checks the switch controlled by the operator to determine whether the switch has been pressed or has been set to a different control position. If so, then the microprocessor adjusts the lamp brightness in response to the switch input and in either case, returns to the main software loop. In the present system, a button may be pressed or a knob may be turned to the change the brightness of the lamp. When a request for a change is detected, the power to the lamp is adjusted to reflect the desired change in the level of luminous flux.

Figure 7:
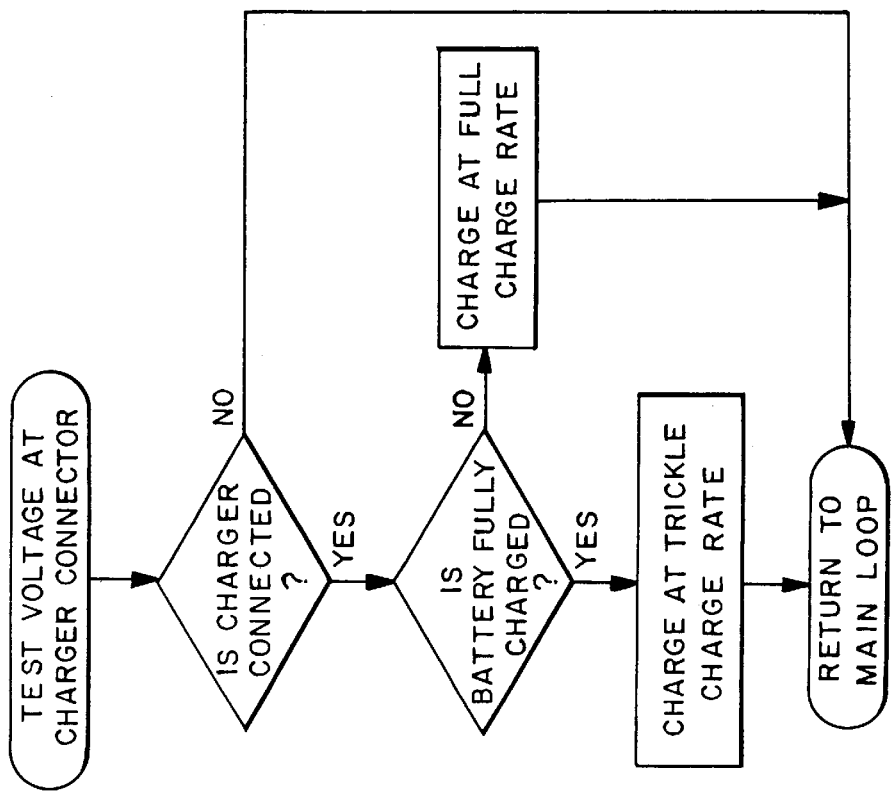
FIG. 7 depicts a block diagram of an algorithm used to monitor the level of charge and adjust the rate of charge of a battery pack of the present invention.

As depicted in FIG. 7, an algorithm is also provided to control the charging of the battery pack 20 by battery charger 105. The algorithm first tests the voltage applied at the charger connection. If a charger is not connected, the algorithm returns to the main software loop. If a charger is connected, then the algorithm determines whether the battery is fully charged. If not, the controller will charge the battery at the full charge rate available and the software algorithm will direct a return to the main software loop. If the battery is fully charged, then the controller will direct the battery to remain charged at a very low or trickle charge rate and the algorithm will return to the main software loop. This algorithm routine will charge the battery at the full charger rate until the battery is completely charged and then maintain the charge at a trickle rate. If no charger is connected to the system, the algorithm will not attempt to charge the battery.

Figure 8:
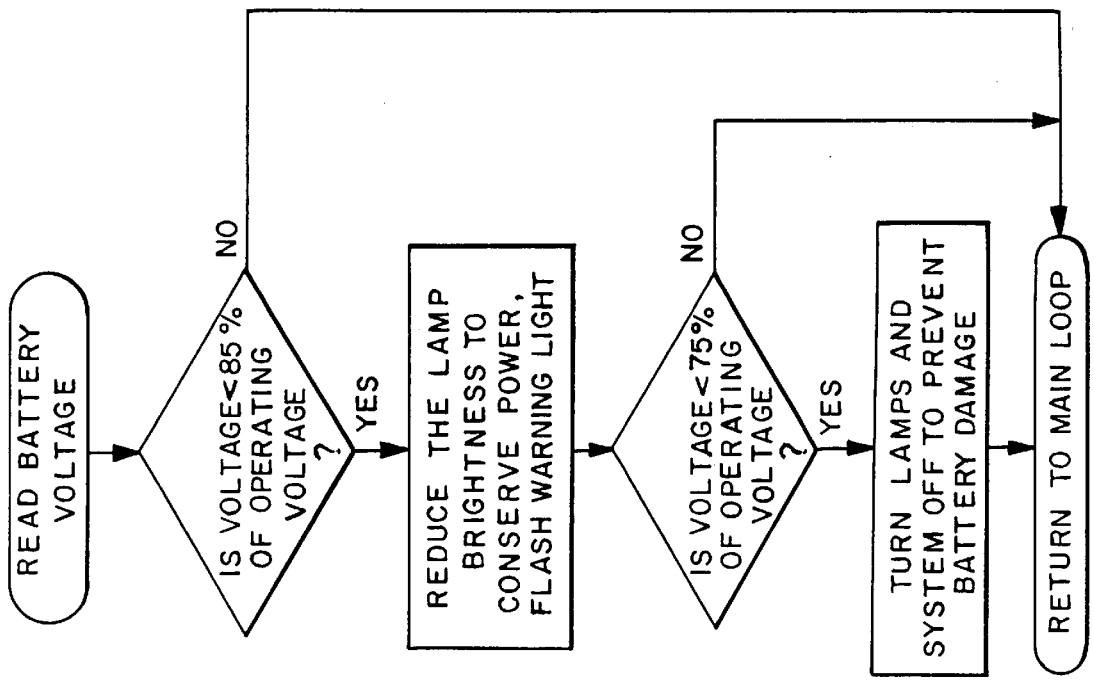
FIG. 8 depicts a block diagram of an algorithm used to monitor the level of charge of a battery pack of the present invention, and discontinue the luminous flux of a lamp of the present invention in response to a low level of charge in the battery pack.

An algorithm is also provided, as depicted in FIG. 8, to monitor the level of charge in the battery pack 20 and, by appropriate control, to provide a predetermined amount of reserve lighting time when the battery pack 20 is almost completely discharged. This function also serves to prevent damage to the battery pack 20 caused by excessive discharge. The algorithm will determine the amount of voltage available in the battery and, if the voltage level is not less than 85% of the operating voltage, will return to the main software loop. If the voltage is less than 85% of the operating voltage, the algorithm will direct the reduction of luminous flux in the lamp to conserve power and, optionally, generate a signal to alert the operator of the lighting system that the lighting system has entered into reserve lighting mode. If the voltage is less than 75% of the operating voltage, the algorithm will generate a signal to terminate the luminous flux and turn off the entire lighting system in order to prevent battery damage due to over discharge. Thus, the reserve/under voltage routine monitors the battery to provide reserve lighting time and prevent damage to the battery due to over discharge, when the battery voltage has dropped to 85% of its normal operating voltage, the system will reduce the lamp brightness to extend the time that the lamp will provide light and will provide a warning to indicate that the system is in reserve mode. If the battery voltage drops to below 75% of its normal operating voltage, than the system will turn off completely to prevent battery damage from over discharge.

Figure 9:
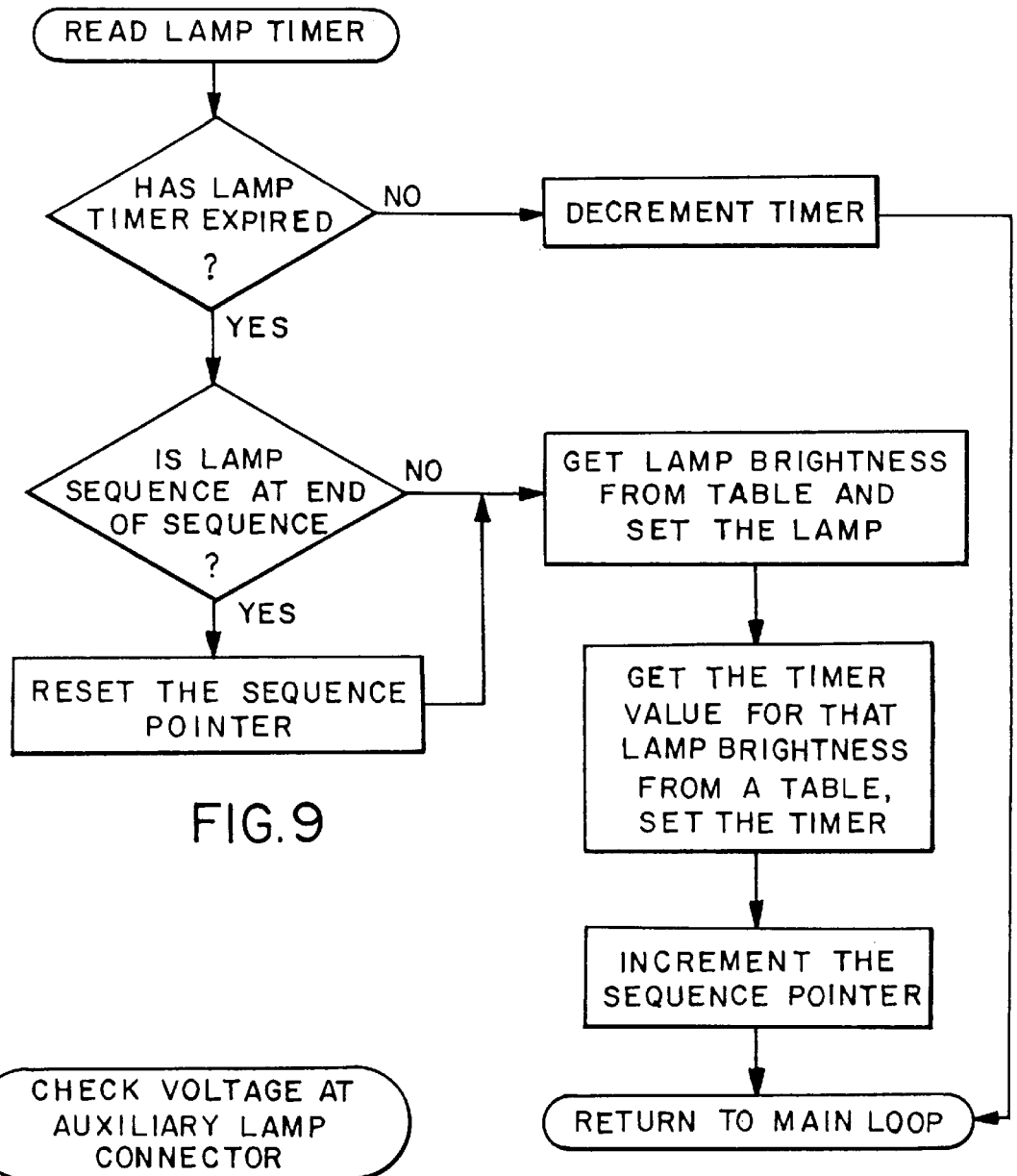
FIG. 9 depicts a block diagram of an algorithm used to initiate and discontinue the luminous flux of a lamp of the present invention in a predetermined repeating pattern.

As depicted in FIG. 9, an algorithm is also provided to control the initiation and termination of luminous discharge from the lamp 40 in a predetermined repetitive sequence. The sequencer is designed to vary the intensity of the light produced by the lamp at a sequence rate. A value is read from a table that holds the desired lamp brightness for each step of the sequence. A value is also read that holds the amount of time that the lamp should hold that brightness level before proceeding to the next entry in the table. The same brightness level will be maintained until a timer expires. At that point the next entry in the sequence will be read. The sequence is repetitive so that it repeats at the start of the sequence when the end of the sequence is reached.

Figure 10:
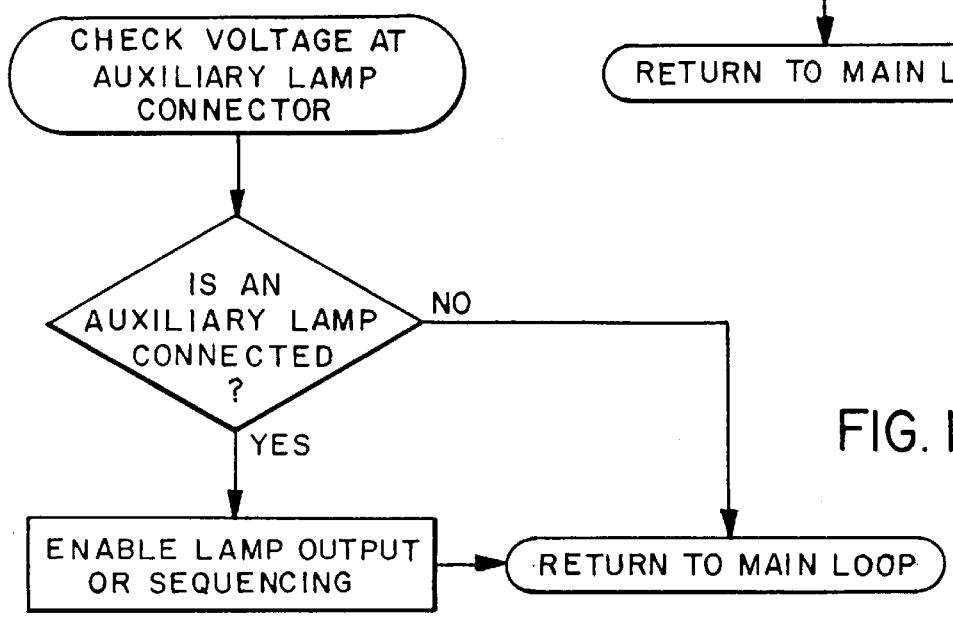
FIG. 10 depicts a block diagram of an algorithm used to initiate the luminous flux of a second lamp of the present invention in a predetermined repeating pattern.

An algorithm is also provided to enable the inclusion of an auxiliary lamp into the system, as depicted in FIG. 10. The algorithm will first check the voltage at the auxiliary lamp connector. If an auxiliary lamp connection is detected, then the algorithm will enable the lamp output or sequencing. If not, then the algorithm directs a return to the main software loop. The auxiliary lamp may be constantly enabled, flashed, or sequenced by the lamp sequencer routine.

Figure 11:
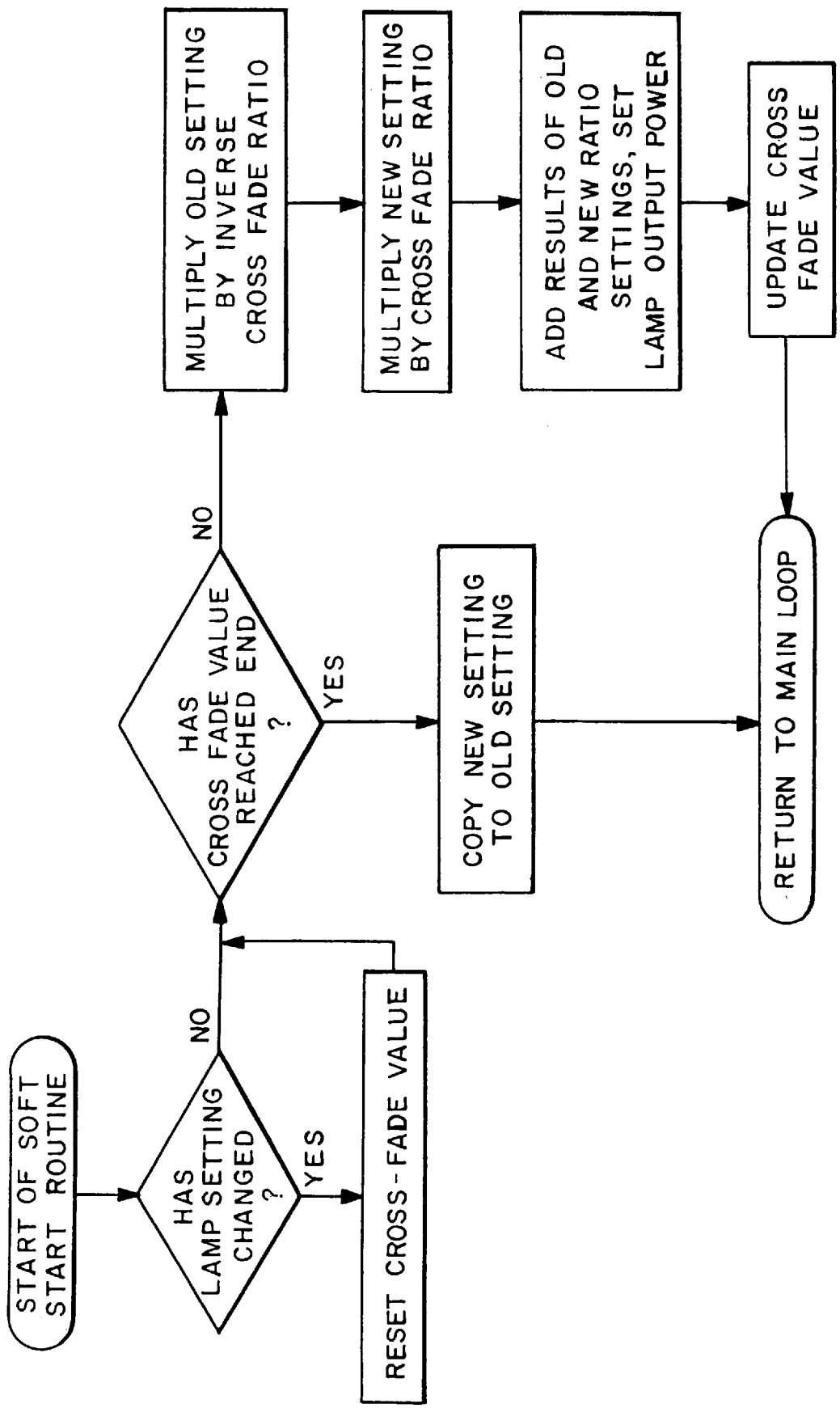
FIG. 11 depicts a block diagram of an algorithm used to initiate the luminous flux of a lamp of the present invention at a predetermined rate of increase of the luminous flux until a predetermined flux level is achieved.

An algorithm is also provided, as depicted in FIG. 11, to effect a relatively smooth measured change between different levels of luminous flux and particularly to provide a gradual transition from a no luminous flux status to luminous flux status. This gradual change enables the filament of the lamp 40 to be warmed more gently and thus extend the life of the lamp 40 as well as provide a smooth transition between lamps in a multi-lamp system. The algorithm first inquires whether a lamp setting has changed, if so, a value termed the cross fade value is reset. The algorithm inquires whether the cross fade value has reached the end point. If so, then the new setting is copied to the old setting and the algorithm returns to the main loop. If the end value has not been reached, the algorithm multiples the old setting by the inverse cross fade ratio, multiplies the new setting by the cross fade ratio, adds the results of the old and new ratio settings to set the lamp output power and updates the cross fade value before returning to the main loop.

Thus it will be seen that the present invention provides a portable controlled lighting system comprising at least one lamp connected to an operating circuit for operating the lamp and a control circuit coupled to the operating circuit for controlling the luminous flux of the lamp is disclosed. A battery pack for providing electrical power to the operating circuit is also provided, together with a control means for adjusting the luminous flux of the lamp by the control circuit. The control means comprises a first adjustment means for controlling the luminous flux of the lamp and provides a predetermined rate of increase of the luminous flux until a predetermined flux level is achieved.

All patents and patent applications cited in this specification are hereby incorporated by reference as if they had been specifically and individually indicated to be incorporated by reference.

Although the foregoing invention has been described in some detail by way of illustration and example for purposes of clarity and understanding, it will be apparent to those of ordinary skill in the art in light of the disclosure that certain changes and modifications may be made thereto without departing from the spirit or scope of the appended claims.

I claim:

1. A portable controlled lighting system comprising at least one lamp connected to an operating circuit for operating said lamp and a control circuit coupled to the operating circuit for controlling the luminous flux of the lamp;

battery pack means for providing electrical power to said operating circuit; and computer control means operatively connected by said control circuit to said operating circuit for adjusting the luminous flux of said lamp by said control circuit, said control means comprising first adjustment means for electronically providing, under computer control, a predetermined rate of increase of an electrical parameter of lamp power until a predetermined flux level is achieved, whereby said computer control means functions to control the luminous flux generated by said lamp.

2. A controlled lighting system as recited in claim 1, wherein said control means is further connectable to a battery charger and operatively connected by said control circuit to said battery pack means for controlling charging of said battery pack means by said battery charger and controlling discharging of said battery pack means through said lamp.

3. A controlled lighting system as recited in claim 2, wherein said control means further comprises first monitoring means for analyzing the level of charge of said battery pack means, and second adjustment means for controlling the rate of charge of said battery pack means.

4. A controlled lighting system as recited in claim 3, wherein said control means further comprises means for reporting the level of charge of said battery pack means to an operator of said lighting system.

5. A controlled lighting system as recited in claim 3, wherein said control means further comprises means for discontinuing the luminous flux of the lamp when the battery pack means is reduced to a predetermined level of charge.

6. A controlled lighting system as recited in claim 3, wherein said control means further comprises means for initiating and discontinuing the luminous flux of the lamp in a predetermined repeating pattern.

7. A controlled lighting system as recited in claim 1, further comprising a plurality of lamps connected to said operating circuit and controlled by said control circuit.

8. A controlled lighting system as recited in claim 7, wherein said control means further comprises third adjustment means for controlling the luminous flux of each of said plurality of lamps and providing a first predetermined rate of increase of the luminous flux in a first lamp until a first predetermined flux level is achieved in said first lamp, while providing a predetermined rate of decrease of the luminous flux in a second lamp until a second predetermined flux level is achieved in said second lamp.

9. A controlled lighting system as recited in claim 7, wherein said control means further comprises means for detecting a failure in one of said plurality of lamps and thereafter providing a predetermined rate of increase of the luminous flux in a second lamp until a predetermined flux level is achieved in said second lamp.

* * * * *

UNITED STATES PATENT AND TRADEMARK OFFICE
CERTIFICATE OF CORRECTION

PATENT NO. : 5,994,791
DATED : November 30, 1999
INVENTOR(S) : Gary A. Rayner

It is certified that error appears in the above-identified patent and that said Letters Patent is hereby corrected as shown below:

In column 2, line 67, please delete "50" therefor.

In column 3, line 1, please delete "50" therefor.

In column 4, line 8, please delete "switch" and insert --switcher-- therefor.

In column 4, line 18, please delete "switch" and insert --switcher-- therefor.

Signed and Sealed this

Eighth Day of August, 2000

Attest:

Q. TODD DICKINSON

*Attesting Officer*  *Director of Patents and Trademarks*